United States Patent [19]

Chang et al.

[11] Patent Number: 5,704,715
[45] Date of Patent: Jan. 6, 1998

[54] ALTITUDE INSENSITIVE AIR BEARING SLIDER

[75] Inventors: Ciuter Chang, Fremont; Yiao-Tee Hsia, Pleasanton; Pablo G. Levi, San Jose; Christopher A. Lee, Pleasanton, all of Calif.

[73] Assignee: Read-Rite Corporation, Milpitas, Calif.

[21] Appl. No.: 700,759

[22] Filed: Dec. 9, 1996

[51] Int. Cl.[6] ............................ F16C 32/06; G11B 5/60
[52] U.S. Cl. .................................. 384/12; 360/103
[58] Field of Search ............................ 384/12, 8, 100, 384/122; 360/103

[56] References Cited

U.S. PATENT DOCUMENTS

| | | | |
|---|---|---|---|
| 5,353,180 | 10/1994 | Murray | 360/103 |
| 5,438,467 | 8/1995 | Dorius et al. | 360/103 |
| 5,490,026 | 2/1996 | Dorius et al. | 360/103 |
| 5,568,981 | 10/1996 | Nepela et al. | 384/12 |
| 5,606,476 | 2/1997 | Chang et al. | 360/103 |

*Primary Examiner*—Thomas R. Hannon
*Attorney, Agent, or Firm*—Nathan N. Kallman

[57] ABSTRACT

The air bearing surface of an air bearing slider is configured with a taper formed at the slider leading end and a rail that is formed with a base and two legs. One leg extends from the base partially toward the trailing end. The other leg extends from the base to the trailing end and is integrally formed of a rectangularly shaped section and one or more polygon-shaped sections. Inner and outer recesses are defined and separated by the rail, such that the slider is effectively insensitive to changes in ambient pressure, particularly from variations in altitude, so that a substantially constant flying height can be maintained.

23 Claims, 9 Drawing Sheets

ALTITUDE INSENSITIVE AIR BEARING SLIDER

CROSS-REFERENCE TO COPENDING PATENT APPLICATION

Copending patent application Ser. No. 08/574,303 filed Dec. 18, 1995, assigned to the same assignee, discloses an air bearing slider that can operate successfully at different altitudes. The subject matter of the copending application is incorporated herein by reference.

1. Field of the Invention

This invention relates to magnetic heads and in particular to an air bearing slider for use in disk drives which may operate at relatively high altitudes and that require constant flying height characteristics.

2. Description of the Prior Art

Magnetic head assemblies that fly relative to rotating magnetic disks are used extensively in disk drives for recording and reading data. One objective when using a flying head on which at least one magnetic transducer is deposited in a transducing relationship with a magnetic recording disk is to obtain a very close spacing between the transducer and the disk surface. By maintaining a close spacing, it is possible to record short wavelength or high frequency signals thereby realizing high density and high storage capacity data recording.

A problem with flying the slider close to the disk surface is that when there is any variation of slider flying height, the possibility of increasing interference between the slider and the disk may result in reliability problems and head crashes. It is highly desirable to fly the slider at a substantially constant flying height close to the disk surface, and to minimize flying height variations when operating the disk drive in a different environment, since variations in head-to-disk spacing adversely affect magnetic performance and drive reliability.

Air bearing sliders used in disk drives typically have a leading edge and a trailing edge at which thin film transducers are deposited. Generally, the sliders have tapered portions at the leading edge and longitudinal rails that extend from the tapers to the trailing edge. The tapers may be shaped and of such length as to provide fast pressure buildup during takeoff of the slider from a rest position to flying attitudes relative to the disk. The dimensions and shapes of the tapers and rails are instrumental in determining the flying characteristics of the head. The rail design determines the pressure generated at the air bearing surface of the slider. In effect, the pressure distribution underneath the slider determines the flying characteristics, including flying height and pitch and roll of the head relative to a rotating magnetic disk.

When using disk drives that incorporate rotating magnetic disks and magnetic heads with air bearing sliders at relatively high altitudes, such as 10,000 feet above sea level for example, the less dense air and lower ambient pressure affect the slider aerodynamic characteristics which contribute to the flying action of the air bearing slider. At high altitudes, prior art sliders experience less aerodynamic lift force, as much as 30% at 10,000 feet, with a significant loss of slider flying height. As a result, the head slider is spaced closer to the rotating disk surface leading to severe head-to-disk interaction, and excessive head-disk wear becomes more probable and disk drive reliability is detrimentally affected.

SUMMARY OF THE INVENTION

An object of this invention is to provide an air bearing slider that offers constant flying height characteristics and also experiences minimal flying height loss at high altitudes.

Another object of the present invention is to provide a new single etch depth air bearing slider that flies at a near constant height under conditions of changing velocity and skew angle, and which displays insensitivity of flying height to changes in ambient pressure.

According to this invention, the air bearing surface of an air bearing slider is configured to provide constant flying height characteristics and to compensate for loss of flying height of the slider which occurs at relatively high altitudes. The slider includes a taper formed at the slider leading end, and a rail that is formed in the general shape of the numeral "7" with a base and two legs. One leg is rectangular and extends partially from the base toward the trailing end. The other leg extends from the base to the trailing end, and is formed of a rectangularly shaped section and a polygon-shaped section. An inner recess and an outer recess are defined and separated by the rail, such that the slider flying height is effectively insensitive to changes in ambient pressure, particularly in variations in altitude, so that a substantially constant flying height can be maintained.

According to one embodiment, the taper may be formed as a single shallow etched step. In another embodiment, the slider may include a beveled chamfer or a notch. In another embodiment, the slider includes a channel formed across the taper and the base of the rail. The channel extends from the leading end of the slider to the inner recess, so as to assist in controlling sub-ambient pressure generated at the air bearing surface. In a preferred design, the channel and the inner and outer recesses are formed in a single etch step.

In yet another embodiment, the slider includes a channel near the trailing end for connecting the inner and outer recesses.

BRIEF DESCRIPTION OF THE DRAWING

The invention will be described in greater detail with reference to the drawing in which.

Similar numerals refer to similar elements in the drawing. It should be understood that the sizes of the different components in the figures are not necessarily to scale or in exact proportions, and are shown for visual clarity and for the purpose of explanation.

DETAILED DESCRIPTION OF THE INVENTION

Figure 1:
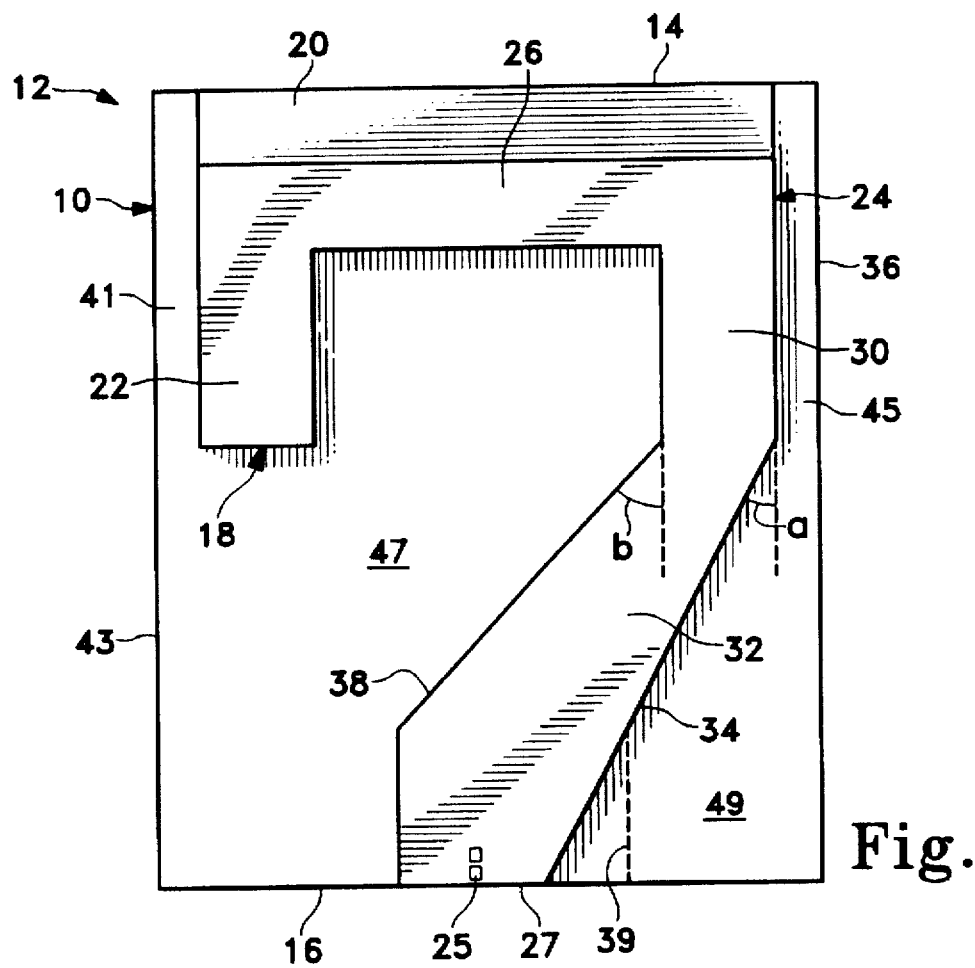
FIG. 1 is a plan view depicting an air bearing surface of an air bearing slider configured in accordance with this invention.
Figure 2:
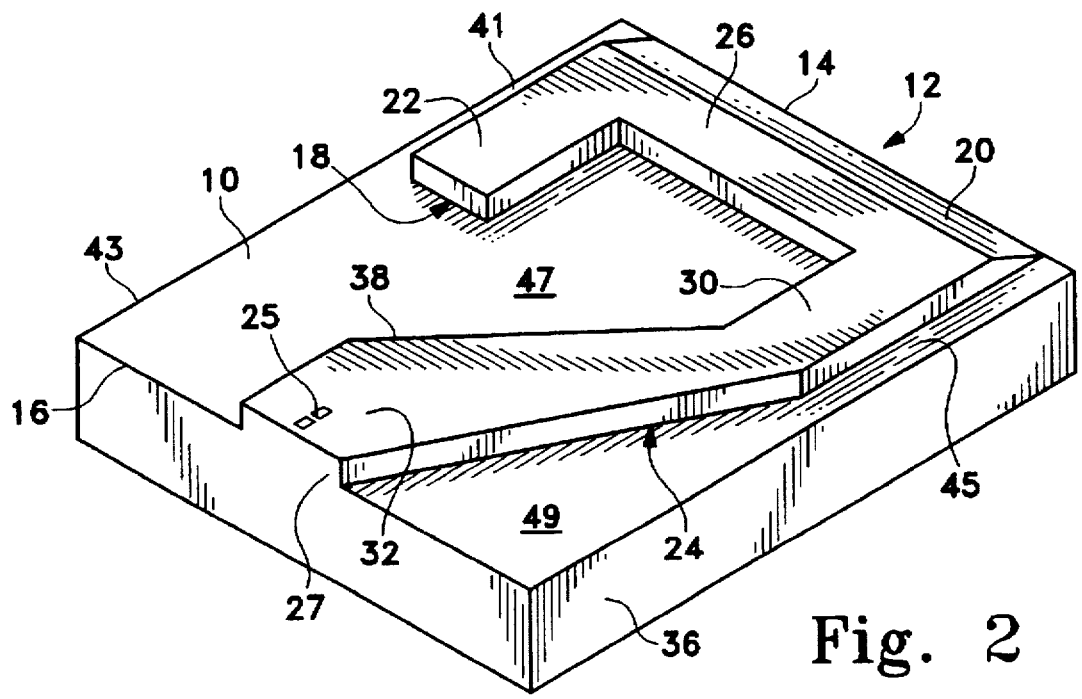
FIG. 2 is an isometric view of the slider of FIG. 1.

With reference to FIG. 1, the patterned air bearing surface 10 of a pico-sized air bearing slider 12 has a leading end 14 and a trailing end 16. The air bearing surface 10 is typically rectangular and includes a rail 18 which is generally formed in the shape of the numeral 7. The rail 18 is formed with a single etch depth. A leading end taper 20 is provided adjacent to the rail 18 to enable fast takeoff of the slider 12 from its rest or home position.

The rail 18 includes a short first leg 22 and a second opposing leg 24 that are joined by a base 26. In this implementation of the invention, the base 26 adjoins the taper 20, the first leg 22 extends from the taper 20 part of the way toward the trailing end 16 of the slider 12, and the second leg 24 extends from the taper 20 continuously to the trailing end 16. A magnetic transducer 25 is disposed at the trailing end 27 of the second leg 24 for interaction with a magnetic medium, such as a magnetic disk.

The second leg 24 is defined by one or more sections. In this particular example the second leg 24 is formed of two sections 30, 32. Section 30 is generally similar in shape and dimensions to the first leg 22. Section 32 has a generally polygonal shape with a first angled side 34 that defines an angle "a" relative to an outer edge 36 of the slider 12, and a second angled side 38 that defines an angle "b" relative to the outer edge 36. The angles "a" and "b" may range from about 5 to 75 degrees. It should be understood that the shape of the rail 18 may vary from the foregoing design, as will be described later in connection with FIG. 7. For example, the first angled side 34 may be formed of two or more sides, such as an angled side and a straight side 39 shown in dashed lines.

A rail defined step 41 is provided along an inner edge 43 of the slider 12 adjacent to the first leg 22, and another substantially similar rail defined step 45 is provided along the opposite edge 36, to protect the slider 12 from rail chipping and cracking during slider fabrication. Both steps 41 and 45 extend from the leading end 14 to the trailing end 16.

As the air bearing surface 10 of the slider 12 is etched away to pattern the rail 18, inner and outer recesses 47, 49, respectively are formed. While the non-etched rail 18 is patterned to generate an optimal positive lift force (Fp), the inner and outer recesses 47, 49 are patterned to generate an opposing suction or pulling force (Fn) due to suction or subambient pressure. The total force (Ft) applied to the slider 12 is expressed by the following equation:

$Ft=Fp-Fn.$

It is an objective of the present invention to maintain the total force (Ft) constant in order to achieve a flat flying height profile, and a relatively low sensitivity to altitude under conditions of changing velocity and skew angle. This objective is reached by arranging the shape of the rail 18 and the etch depth of the recesses 47, 49, and by taking advantage of the skew, in order to cause the forces Fp and Fn to drop by about the same value. The variation in the forces Fp and Fn is expressed by the following equation:

$\Delta Fn=\Delta Fp.$

With the present design the total force may, for instance, be maintained at about 2 grams, with the positive force generated by the rail 18 being about 3.7 grams, and the suction force generated by the recesses 47, 49 being about 1.7 grams. This design yields a flying height profile variation of about 0.08 micro-inch, and an altitude variation of between 0.10 micro-inches and 0.27 micro-inches.

While the shorter leg 22 is described as being adjacent to the slider inner edge 43 and the longer leg 24 is located adjacent to the slider outer edge 36, the position of these two legs may be mirrored or reversed, such that the shorter leg 22 is placed adjacent to the outer edge 36 and the longer leg 24 is placed adjacent to the inner edge 43.

Figure 3:
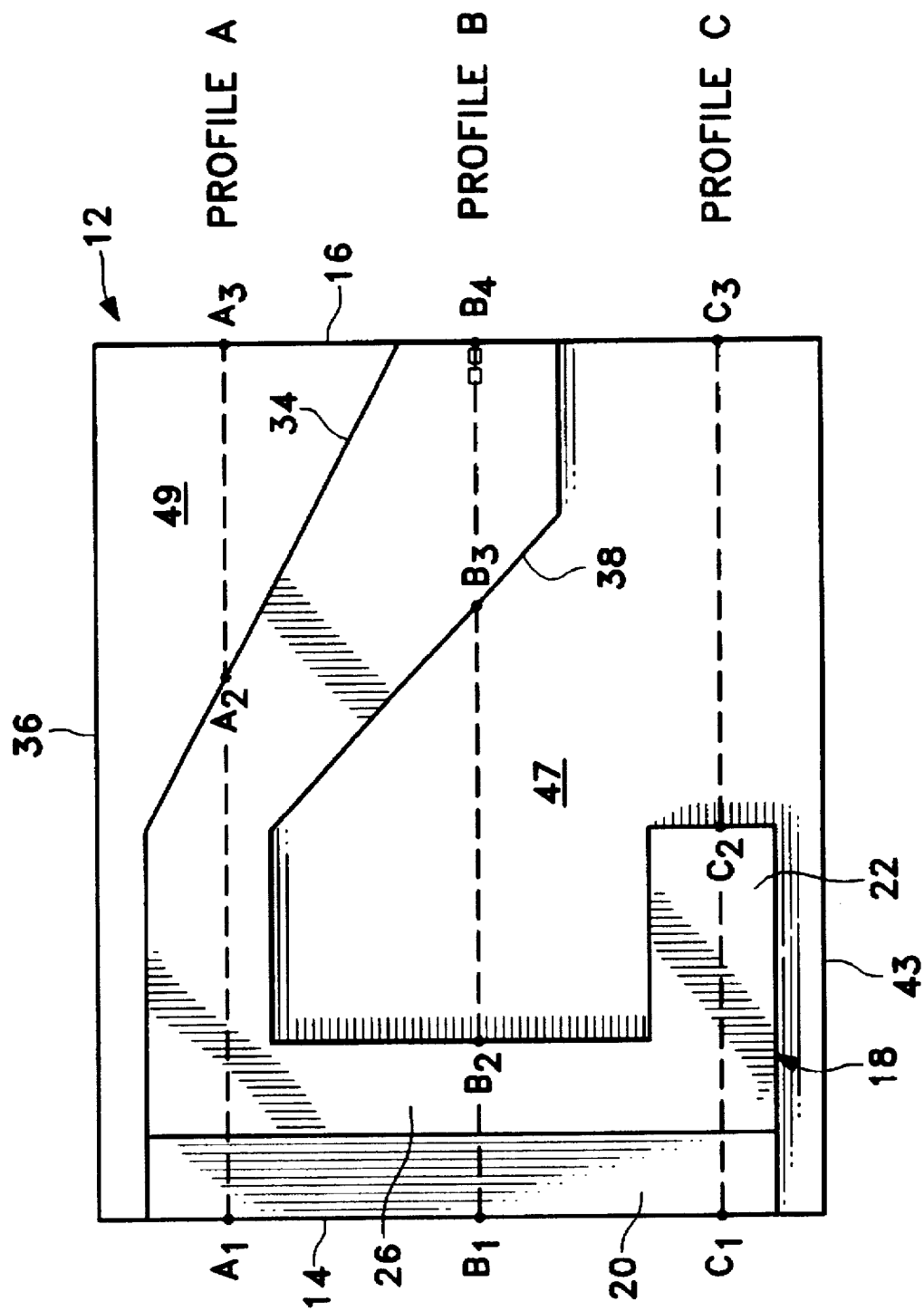
FIG. 3 is a plan view of the slider air bearing surface similar to that shown in FIG. 1, but rotated counterclockwise for correspondence with the pressure profile charts plotted in FIGS. 4 and 5.
Figure 4A:
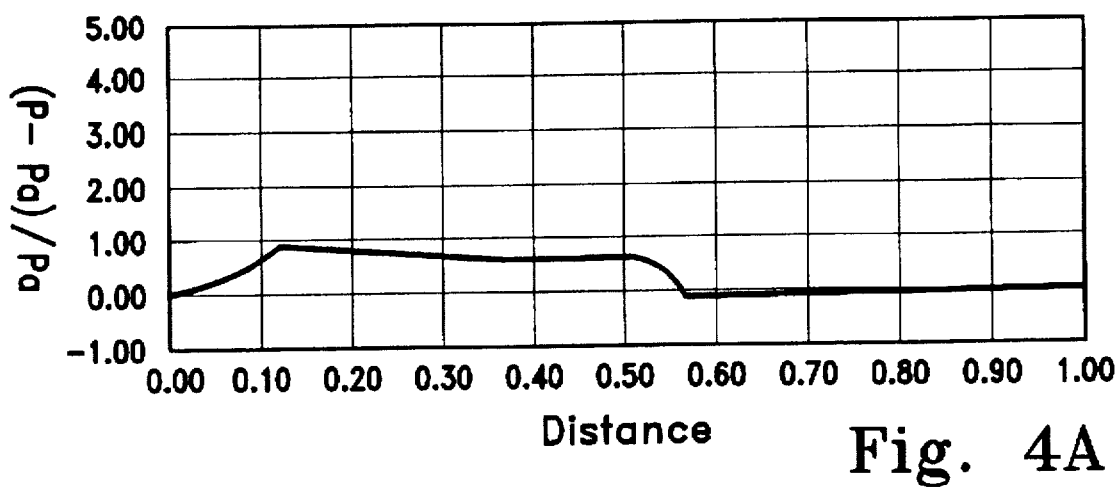
FIGS. 4A–C represent three exemplary pressure profile charts corresponding to sections along the slider air bearing surface of FIG. 3.
Figure 4B:
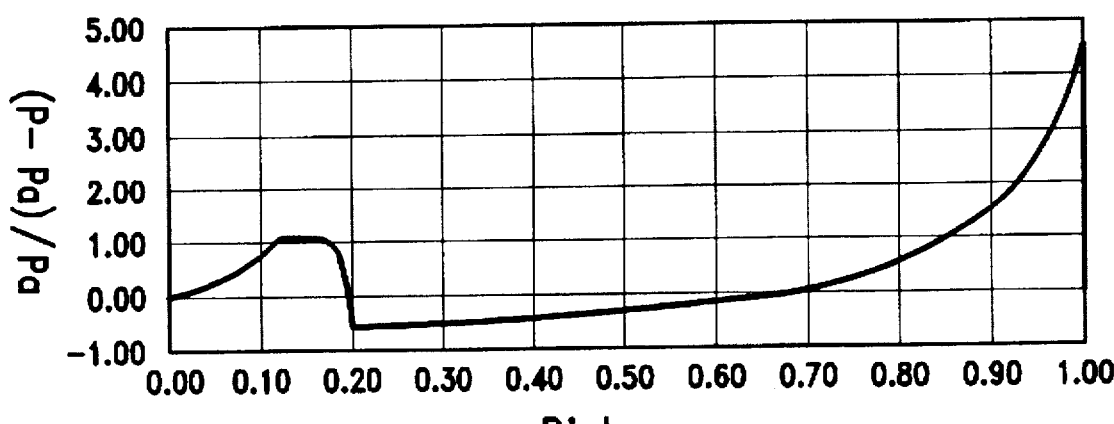
Figure 4C:
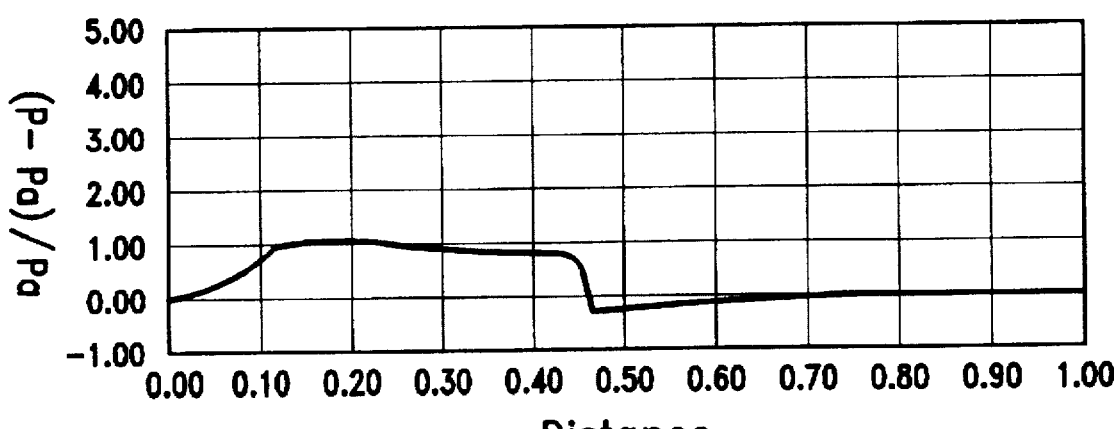

FIGS. 4A-C illustrate three exemplary pressure profile charts (Profiles A, B, C) of the slider 12, along various sections of the air bearing surface 10 of FIG. 3. In these three charts, the pressure profile is plotted versus distance along the length of the slider 12, and Pa represents the ambient pressure.

With reference to FIG. 3 and FIGS. 4A-C, the first Profile A starts at the ambient pressure Pa, at point A1 on the taper 20, and increases along the second leg 24 until it reaches point A2 on the outer edge of the first angled side 34 interfacing with the recess 49. At point A2 the pressure drops sharply to a slightly sub-ambient pressure, and then starts to increase slowly along the outer recess 49 until it reaches the ambient pressure Pa at point A3 on the trailing end 16. The outer recess 49 plays an active and important role in stabilizing and balancing the overall slider 12. Profile B starts at the ambient pressure Pa, at point B1 on the taper 20. The pressure then increases along the base 26 until point B2 on the edge of the base 26 adjacent to the recess 47 is reached, at which point the air flow entering the inner recess 47 produces a relatively large sub-ambient pressure causing the pressure to drop sharply. The pressure then increases along the inner recess 47 back toward the ambient pressure Pa until point B3 on the second angled side 38 of the rail 18 is reached. At point B3 the pressure increases sharply until it reaches the trailing end 16, whereupon the pressure drops sharply to the ambient pressure Pa.

Turning to Profile C, it starts at the ambient pressure Pa at point C1 on the taper 20, and increases along the first leg 22 until it reaches point C2 on the edge of the first leg 22. At point C2 the pressure drops sharply along the inner recess 47 to a slightly sub-ambient pressure, and then starts to increase slowly until it reaches the ambient pressure Pa at point C3 on the trailing end 16.

Figure 5:
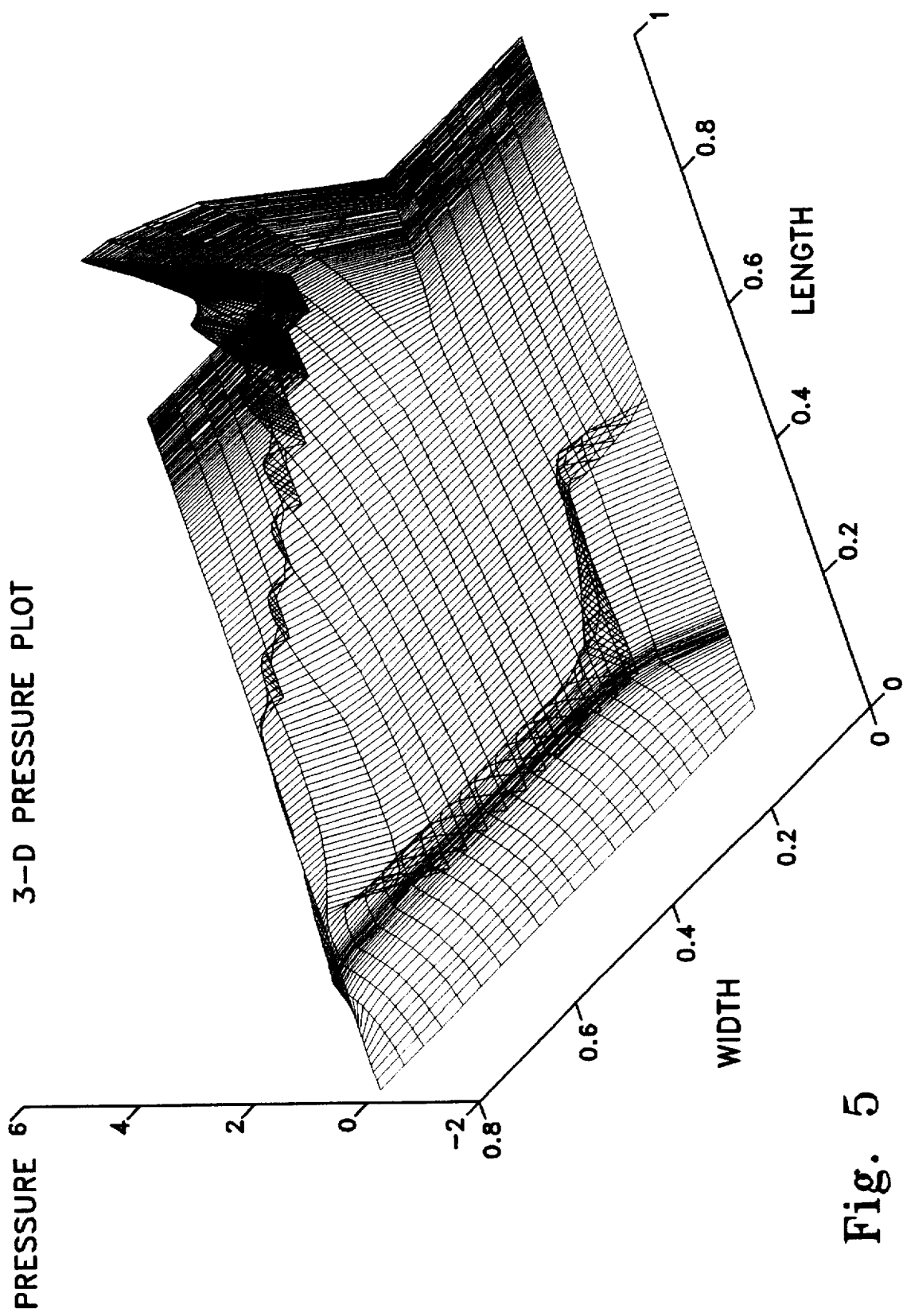
FIG. 5 is an isometric view showing an exemplary pressure distribution on the slider air bearing surface of FIG. 3.

The overall pressure distribution on the slider air bearing surface 10 is illustrated in FIG. 5 and depicts the balanced distribution of the forces and moments acting on the air bearing surface, to effect a substantially constant flying height.

Figure 6:
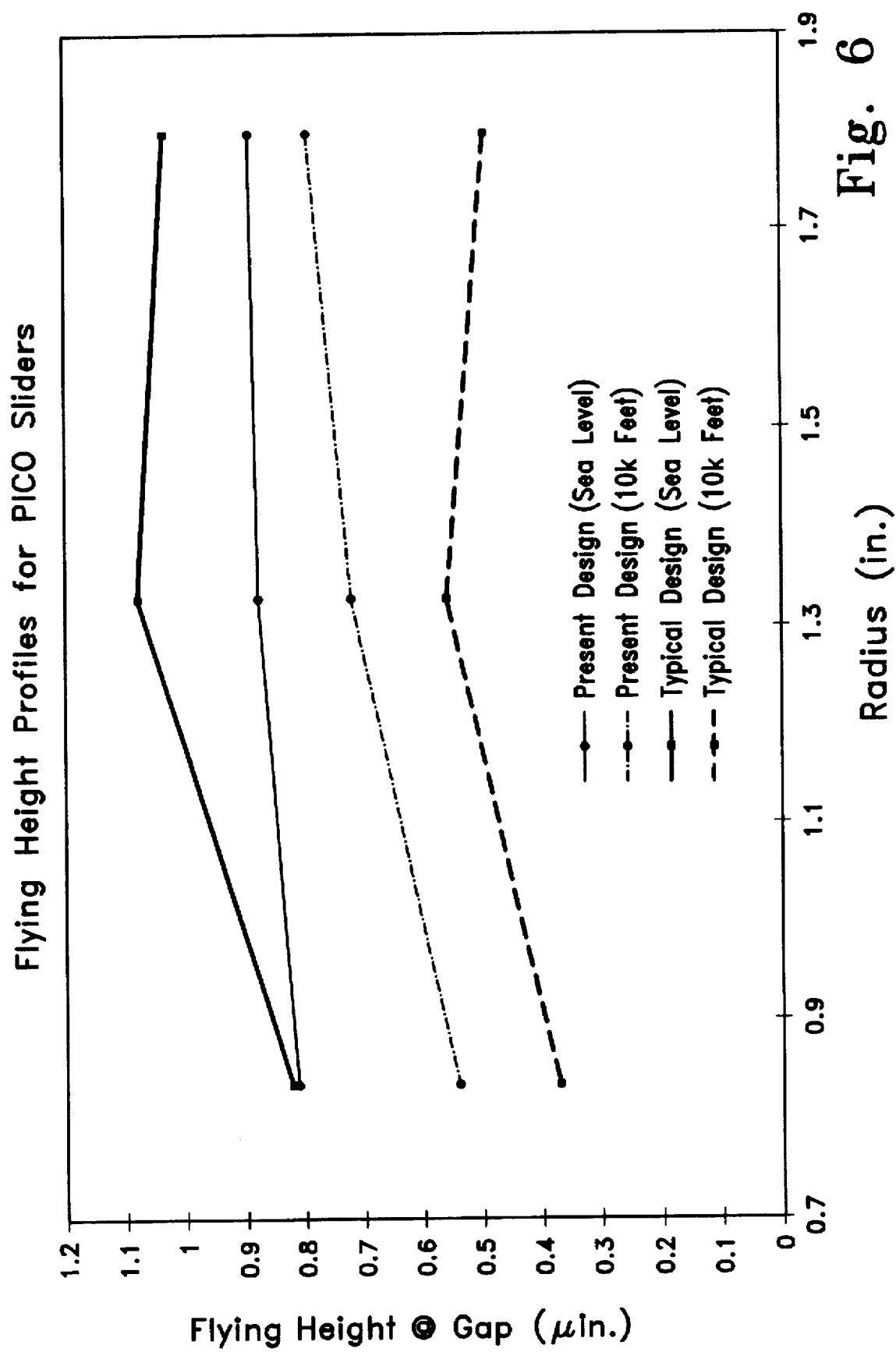
FIG. 6 is a graph plotting flying height versus disk radius showing the altitude sensitivity of the air bearing slider of the present invention as compared to another conventional air bearing slider for operation at different altitudes.

The plots of FIG. 6 provide a comparison of the altitude sensitivity of the slider design of this invention and a commonly used conventional slider obtained by modeling. The flying height profile of the inventive slider 12 disclosed herein is generally flat, and manifests the least flying height loss at 10,000 feet above sea level.

The following Table I presents results of the action of slider 12, when operating in a disk drive with the magnetic disk rotating at about 4,500 rpm (revolutions per minute), compared to a conventional slider. Note that the flying height stays within a narrow range at sea level and 10,000 feet altitude for the same parameters of disk radius and skew angle of the slider relative to the disk data tracks.

TABLE I

Slider Flying Height Comparative Study

| Radius | Present Slider | | Conventional Slider | |
|---|---|---|---|---|
| (inch) | Sea Level | Altitude 10k | Sea Level | Altitude 10K |
| 0.834 | 0.81 | 0.54 | 0.82 | 0.37 |
| 1.33 | 0.88 | 0.72 | 1.08 | 0.56 |
| 1.795 | 0.89 | 0.79 | 1.03 | 0.49 |

By virtue of the slider design disclosed herein, the magnetic performance and reliability of the disk drive at high altitudes are enhanced. In effect, the slider geometry compensates for the decrease in both positive and subambient pressures, which are generated on the slider during flying operation that occurs at higher altitudes. The preload force applied typically by means of a flexure and load beam, is balanced with the lift force and subambient pressure force to realize a substantially constant flying height at high altitudes.

In an implementation of the picoslider design which measures about 0.049 inch in length, 0.039 inch in width and 0.012 inch in thickness, the length of the taper 20 and that of the adjoining base 26 is about 10% of the slider length. The width of the first leg 22 is approximately 10% to 25% of the slider body width.

The length of the first leg 22 and that of the section 30 measured from the taper 20 is about 40% of the slider length but may be in the range of 25% to 75% of the slider length depending upon disk drive design. The polygon-shaped section 32 is determined by the angles "a" and "b" of the angled sides 34 and 38, respectively. Both angles "a" and "b" may be in the range of 5 degrees to 75 degrees.

The inner and outer recesses 47 and 49 may be formed by a single step of reactive ion etching or ion milling or laser etching techniques to a relatively shallow depth in the range of between 1 to 5 microns. The optimal depth may be determined by the flying performance and altitude sensitivity for given drive operating conditions. The recesses 47 and 49 and the rail defined steps 41 and 45 are formed in a single etch step, substantially to the same depth. In an alternative embodiment, the recesses 47 and 49 may be etched to different depths.

Figure 7:
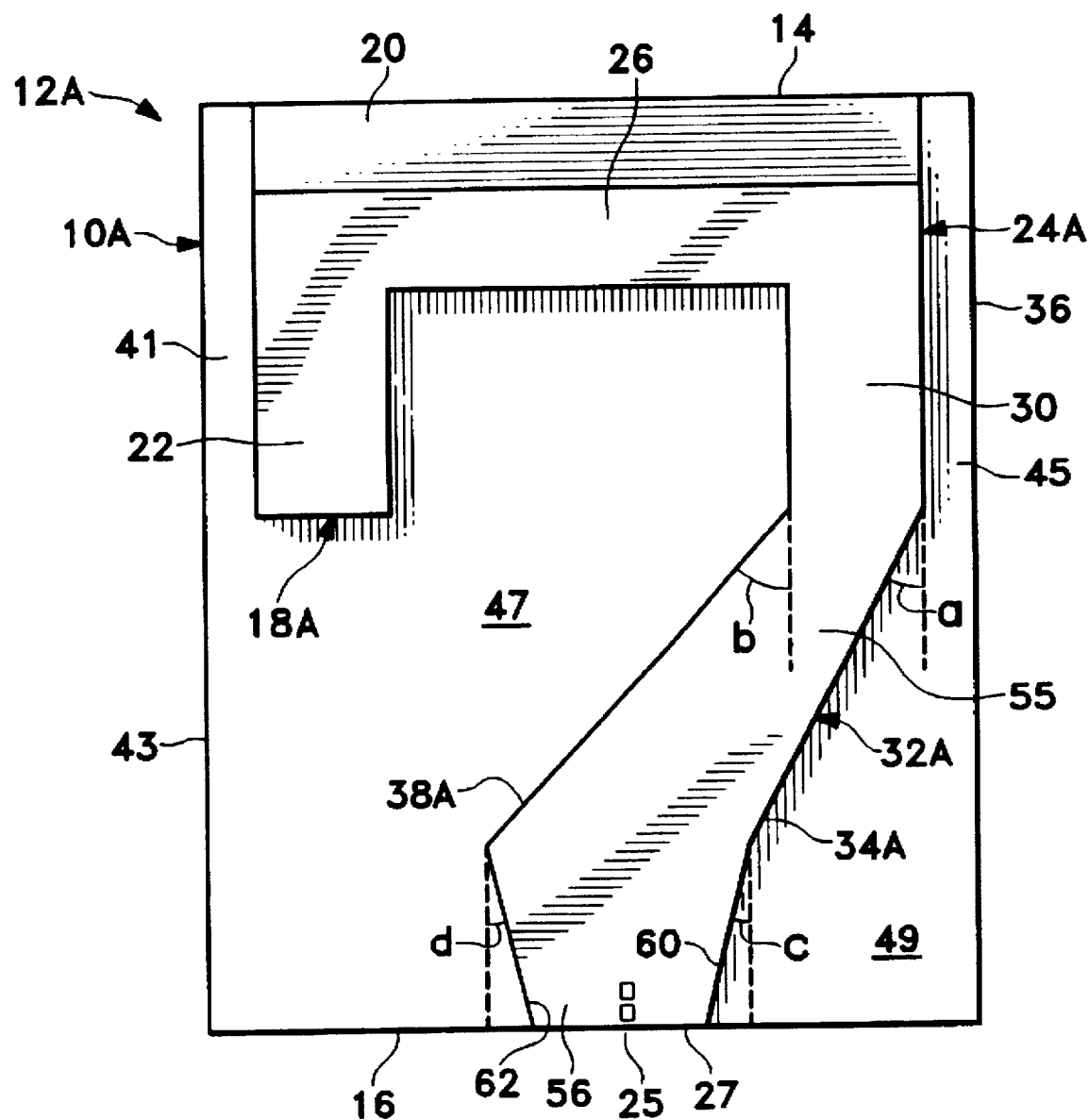
FIG. 7 is a plan view depicting an alternative air bearing surface of an air bearing slider made in accordance with this invention, showing a variation in the rail design.

FIG. 7 shows an air bearing surface 10A of another slider 12A made in accordance with this invention. FIG. 7 illustrates a variation in the design of the rail 18A, wherein the second leg 24A may be formed of several polygon-shaped sections, for instance 30 and 32A. In this particular example the section 32A is formed of two portions 55 and 56. Portion 55 includes a first angled side 34A that defines an angle "a" relative to the outer edge 36, and a second angled side 38A that defines an angle "b" relative to the outer edge 36. Portion 56 includes two sides 60, 62 that define angles "c" and "d" respectively, relative to the outer edge 36. The angles "c" and "d" may range from about −45 to +45 degrees.

Figure 8:
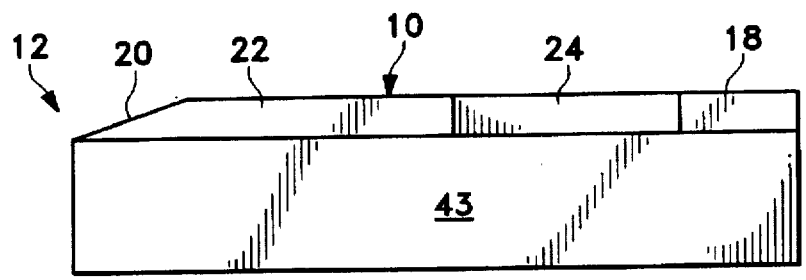
FIG. 8 is a side elevational view of the slider of FIG. 1.

FIGS. 8 through 13 are side elevational views of various exemplary air bearing sliders, showing various taper configurations according to the present invention. FIG. 8 is a side view of the slider 12 of FIG. 1, illustrating the sloping slider 12. Slider 12 may be formed by a mechanical process, such as by lapping.

Figure 9:
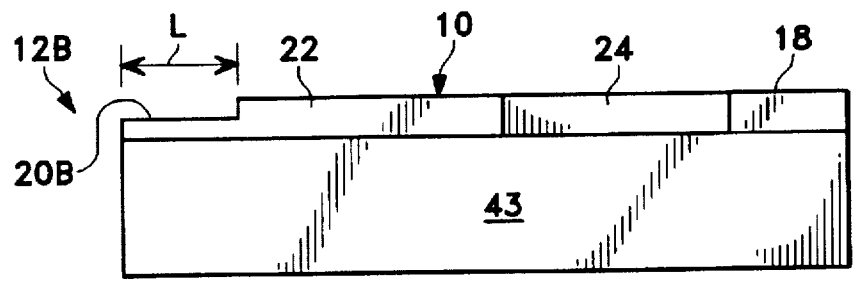
FIGS. 9–13 are side elevational views of exemplary alternative air bearing sliders, showing various taper configurations according to the present invention.

FIG. 9 is a side elevational view of another slider 12B which is similar to the slider 12 of FIG. 8, with the exception that the slider 12B includes an etched taper 20B that is formed as a single shallow etched step. The etched taper 20B facilitates the manufacturing control of the slider 12B, in that length "L" of the taper 20B is no longer required to be constant across the entire slider body or of a particular shape. In addition, the taper 20B results in an improved control of the pressure build up and slider pitch.

Figure 10:
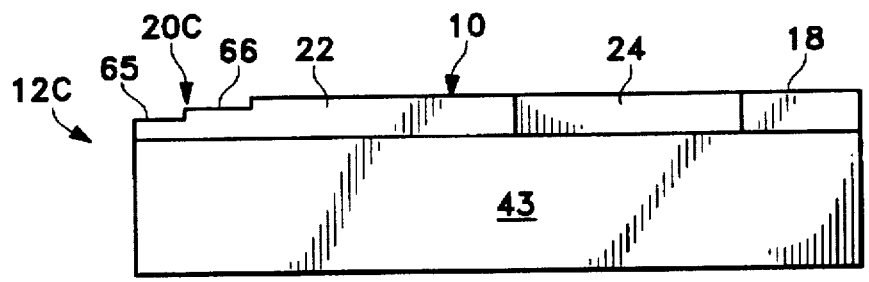

FIG. 10 is a side elevational view of another slider 12C which is similar to the slider 12B of FIG. 9. According to this configuration the slider 12C includes a step etched taper 20C, so that instead of having a single step as illustrated in FIG. 9, the taper 20C includes two or more steps, i.e., steps 65, 66.

Figure 11:
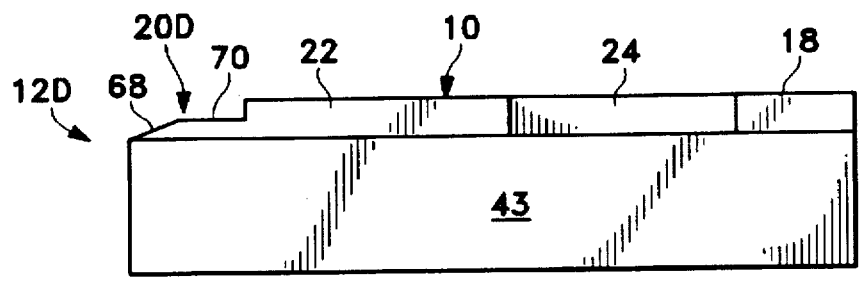

FIG. 11 is a side elevational view of another slider 12D which is similar to the sliders 12 and 12C of FIGS. 8 and 10 respectively. According to this configuration the slider 12D includes a hybrid taper 20D that comprises a mechanically formed beveled chamfer 68 similar to the taper 20 (FIG. 8), and one or more steps, i.e., step 70, that are similar to step 65 (FIG. 10).

Figure 12:
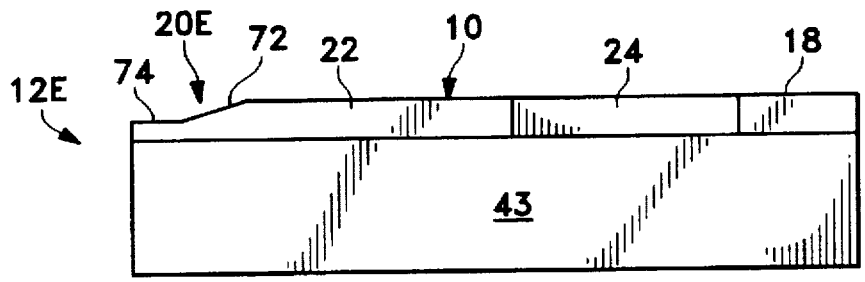

FIG. 12 is a side elevational view of another slider 12E which is similar to the slider 12D of FIG. 11. According to this configuration the slider 12E includes a hybrid taper 20E, a beveled chamfer 72, and a step 74 similar to step 70. The difference between the sliders 12D and 12E is the physical arrangement of the chamfer 72 and the step 74.

Figure 13:
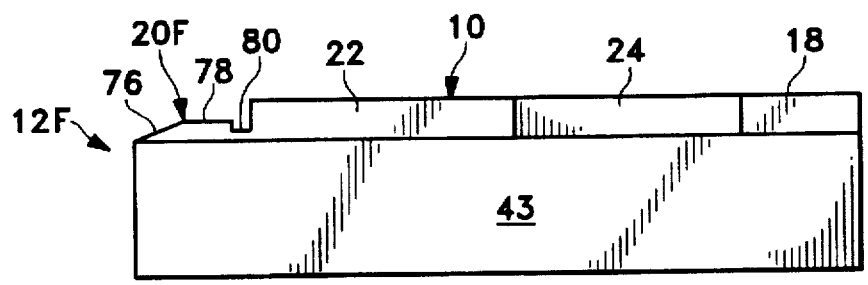

FIG. 13 is a side elevational view of another slider 12F which is similar to the slider 12D of FIG. 11. According to this configuration the slider 12F includes a hybrid taper 20F formed of a beveled chamfer 76 similar to the chamfer 68, a step 78 similar to step 70, and a notch 80. The physical arrangement of the chamfer 76, step 78 and notch 80 may vary.

Figure 14:
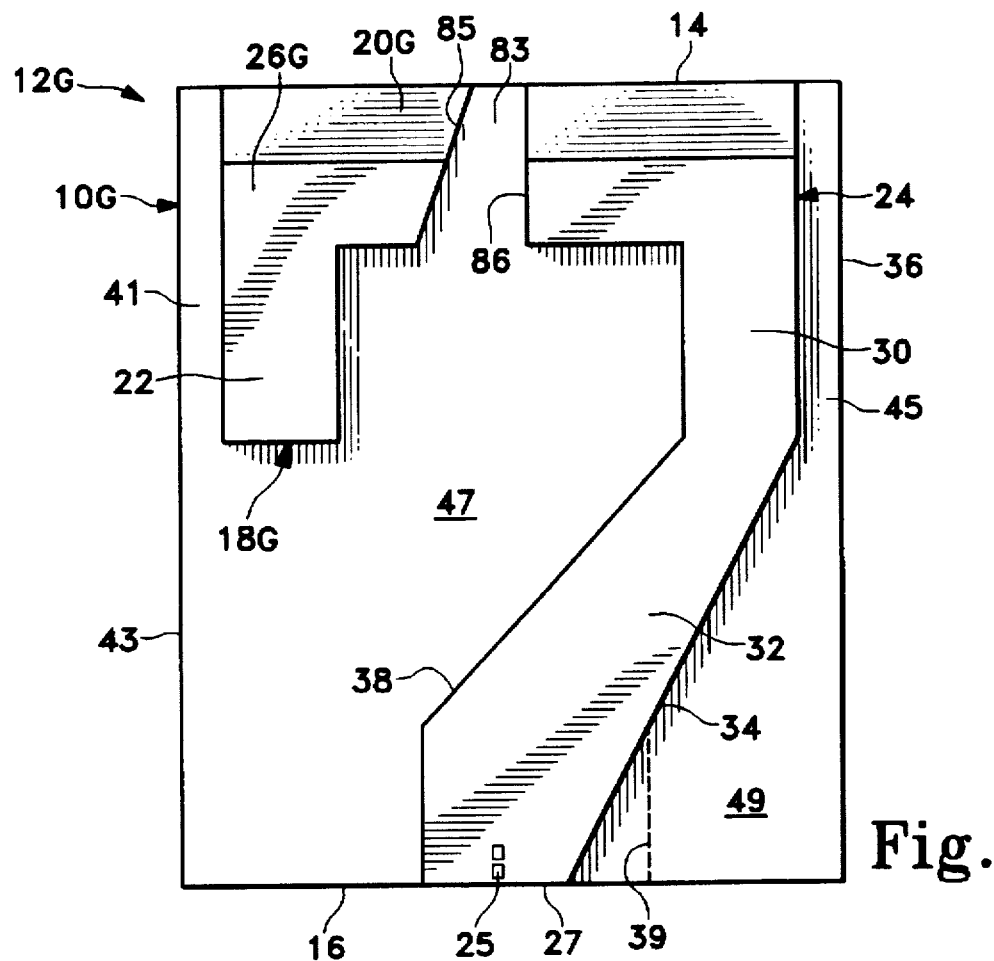
FIG. 14 is a plan view depicting another air bearing surface of an air bearing slider configured in accordance with this invention, and showing a channel for controlling sub-ambient pressure.
Figure 15:
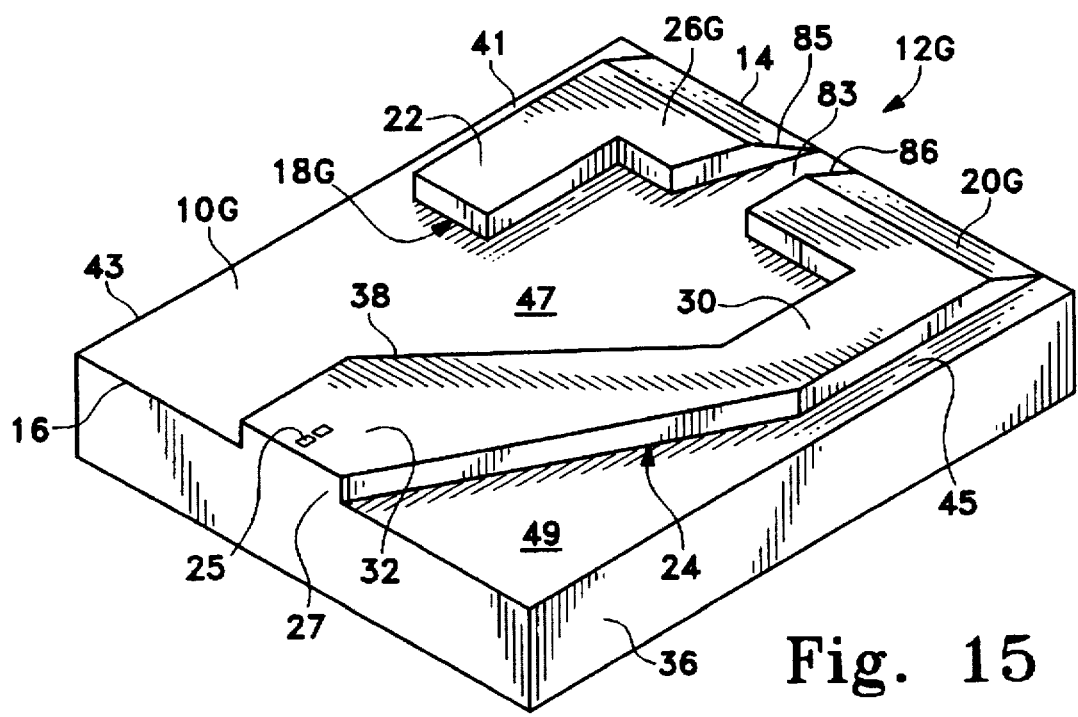
FIG. 15 is an isometric view of the slider of FIG. 14.

FIGS. 14 and 15 illustrate yet another air bearing surface 10G of an air bearing slider 12G made in accordance with this invention. The air bearing surface 10G includes a single etch depth rail 18G which is generally similar to the rail 18, and which includes a first leg 22 and a second opposing leg 24 that are joined by a base 26G. The base 26G adjoins a taper 20G. A channel 83 is formed across the taper 20G and the base 26G and extends to the inner recess 47. The channel 83 assists in controlling the sub-ambient pressure generated on the air bearing surface 10G. Preferably, the channel 83 has a similar etch depth as the inner recess 47.

The channel 83 is defined by two side edges 85, 86 of the base 26G, and has an average width up to 10% approximately of the slider width. The shape of the channel 83 is not limited to the shape shown in FIGS. 14 and 15, but may be changed to optimize the head performance. For instance, while the edge 85 is shown to extend at an angle relative to the slider outer edge 36, it may alternatively be parallel to the outer edge 36. Similarly, the edge 86 may either be parallel to, or at an angle relative to the outer edge 36.

Figure 16:
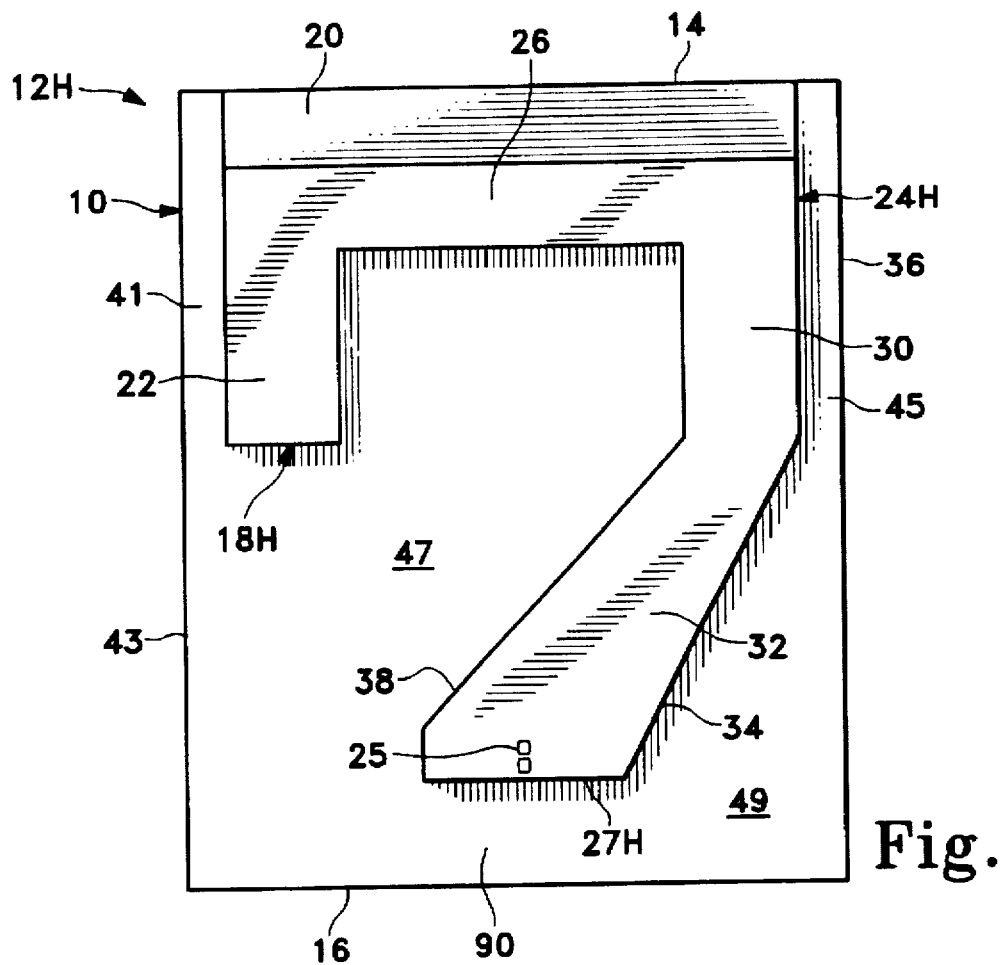
FIG. 16 is a plan view of another air bearing surface of an air bearing slider configured with the magnetic transducer not at the slider trailing end, according to this invention.
Figure 17:
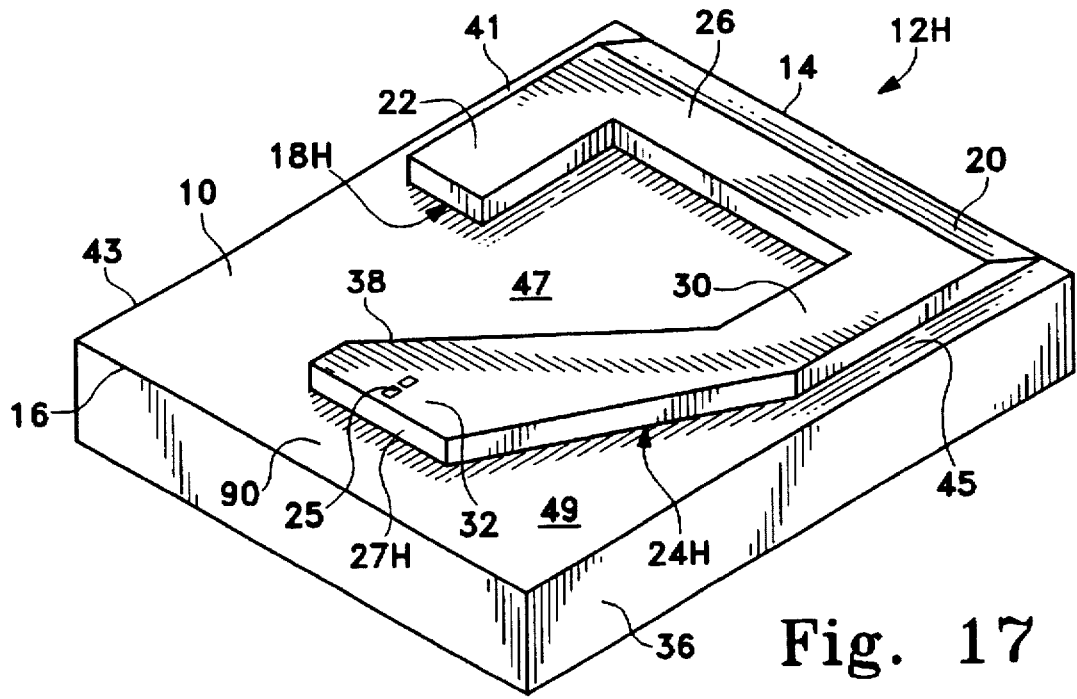
FIG. 17 is an isometric view of the slider of FIG. 16.

FIGS. 16 and 17 illustrate another slider 12H made with a magnetic transducer positioned at a distance from the trailing end 16, in accordance with this invention. The air bearing surface 10H includes a single etch depth rail 18H which is generally similar to the rail 18, and which includes a first leg 22 and a second opposing leg 24H that are joined by the base 26. A channel 90 is formed near the trailing end 16 of the slider 12H, for extending the inner recess 47 to the outer recess 49. Preferably, the channel 90 has the same or similar etch depth as the inner and outer recesses 47, 49.

The trailing end 27H of the second leg 24H is not coplanarly arranged relative to the trailing end 16 of the slider 12H. The trailing end 27H is positioned at a distance from the trailing end 16, and is separated therefrom by the channel 90, such that the magnetic transducer 25 is disposed at the trailing end 27H, where minimum flying height is likely to occur.

It should be understood that the geometry, dimensions and parameters described above may be modified within the scope of the invention. For example, the widths and lengths of the legs and base of the rail, portions of the polygon-shaped section, and the leading edge taper may be modified depending upon the disk drive operating characteristics and the altitudes of drive operation. Also the etch depths of the recesses may differ for different applications. The legs may have rounded, arcuate or angled corners instead of being rectangular with 90 degree corners. Other modifications may be made when implementing the invention for a particular environment. Further, while the invention has been described in relation to a pico-sized slider, it should be understood that the invention may be applied to other sliders of different sizes.

What is claimed is:

1. An air bearing slider having an air bearing surface, a leading end and a trailing end and first and second parallel sides between said leading and trailing ends comprising:

a taper formed at the leading end;

a rail extending from said taper towards the trailing end, said rail being formed in the general shape of the numeral "7", with a base and first and second legs;

said first leg being shorter than said second leg, said first leg extending partially from said base toward the trailing end;

said second leg extending from said base to the trailing end, said second leg configured with at least one polygon-shaped section; and inner and outer recesses defined and separated by said rail;

whereby said slider is effectively insensitive to changes in ambient pressure and to variations in altitude, so that a substantially constant flying height of said slider can be maintained.

2. An air bearing slider as is in claim 1, wherein said second leg includes a trailing end that coincides with the slider trailing end; said slider including a magnetic transducer disposed at the trailing end of said second leg for interaction with a magnetic medium.

3. An air bearing slider as is in claim 1, wherein said polygon-shaped section is formed of a first angled side that defines an angle "a" relative to the first side of said slider and a second angled side that defines a different angle "b" relative to said slider first side.

4. An air bearing slider as is in claim 3, wherein said angle "a" ranges between 5 and 75 degrees.

5. An air bearing slider as is in claim 3, wherein said angle "b" ranges between 5 and 75 degrees.

6. An air bearing slider as is in claim 1, wherein said polygon-shaped section is formed with an angled side that defines an angle "c" relative to the first side of said slider and an angled side that defines an angle "d" relative to the first side of said slider wherein said angles "c" and "d" are in the range of −45 to +45 degrees.

7. An air bearing slider as in claim 1, wherein said second leg includes a trailing end that is not coplanar with said trailing end of said slider; and wherein said slider includes a magnetic transducer disposed at the trailing end of said second leg.

8. An air bearing slider as is in claim 1, including rail defined steps extending from the slider leading end to the slider trailing end.

9. An air bearing slider as in claim 8, wherein said rail defined steps are of the same depth as said recesses.

10. An air bearing slider as in claim 1, wherein each of said recesses is formed to a depth of about 1 to 5 microns.

11. An air bearing slider as in claim 10, wherein said recesses are formed to a similar depth by etching.

12. An air bearing slider as in claim 11, wherein said etching comprises reactive ion etching, ion milling, or laser etching.

13. An air bearing slider as in claim 1, wherein each of said recesses are etched to different depths.

14. An air bearing slider as in claim 1, wherein said inner recess is defined by said rail and one side of said slider, and said outer recess is defined by said rail and the side opposite to said one side of said slider.

15. An air bearing slider as in claim 1, wherein said taper is formed as a single shallow etched step.

16. An air bearing slider as in claim 15, wherein said taper is etched to a depth between 5 to 40 microinches.

17. An air bearing slider as in claim 1, wherein said taper is formed with a notch.

18. An air bearing slider as in claim 1, wherein said taper is formed with at least two steps.

19. An air bearing slider as in claim 18, wherein said taper includes a hybrid taper comprised of a beveled chamfer and at least one step.

20. An air bearing slider as in claim 18, wherein said taper includes a notch.

21. An air bearing slider as in claim 1, including a channel formed across said taper and said base, said channel extending between the leading end of said slider and said inner recess for controlling sub-ambient pressure generated at the air bearing surface.

22. An air bearing slider as in claim 21, wherein said channel and said recesses are formed in a single etch step.

23. An air bearing slider as in claim 1, including a channel near the trailing end for connecting said recesses.

* * * * *